United States Patent
Van Thiel (10) Patent No.: US 11,964,642 B2
(45) Date of Patent: Apr. 23, 2024

(54) ELECTROPNEUMATIC PARKING BRAKE MODULE WITH DIRECTLY CONTROLLED VALVES AND ANTI-COMPOUND CONNECTION

(71) Applicant: Wabco GmbH, Hannover (DE)

(72) Inventor: Julian Van Thiel, Grossburgwedel (DE)

(73) Assignee: ZF CV SYSTEMS EUROPE BV, Brussels (BE)

(*) Notice: Subject to any disclaimer, the term of this patent is extended or adjusted under 35 U.S.C. 154(b) by 424 days.

(21) Appl. No.: 17/261,183

(22) PCT Filed: Jun. 27, 2019

(86) PCT No.: PCT/EP2019/067193
§ 371 (c)(1),
(2) Date: Jan. 19, 2021

(87) PCT Pub. No.: WO2020/015975
PCT Pub. Date: Jan. 23, 2020

(65) Prior Publication Data
US 2021/0162974 A1 Jun. 3, 2021

(30) Foreign Application Priority Data
Jul. 20, 2018 (DE) ............ 10 2018 117 596.5

(51) Int. Cl.
*B60T 13/68* (2006.01)
*B60T 7/20* (2006.01)
(Continued)

(52) U.S. Cl.
CPC ............ *B60T 13/683* (2013.01); *B60T 13/26* (2013.01); *B60T 13/662* (2013.01); *B60T 7/20* (2013.01);
(Continued)

(58) Field of Classification Search
CPC .......... B60T 13/683; B60T 7/20; B60T 13/26; B60T 13/662; B60T 17/221; B60T 2400/81
See application file for complete search history.

(56) References Cited

U.S. PATENT DOCUMENTS 11,400,906 B2 * 8/2022 Bensch ............... B60T 13/662
2005/0029859 A1 2/2005 Bensch et al.
(Continued)

FOREIGN PATENT DOCUMENTS

DE 10336611 A1 3/2005
DE 102008014547 A1 9/2009
(Continued)

OTHER PUBLICATIONS

Translation of WO document No. 2008/061799 to Hilberer obtained from website: https://worldwide.espacenet.com on Jul. 12, 2023.*

*Primary Examiner* — Pamela Rodriguez
(74) *Attorney, Agent, or Firm* — LEYDIG, VOIT & MAYER, LTD.

(57) ABSTRACT

An electropneumatic parking brake module includes a supply connection configured to connect a compressed air supply, at least one spring-type actuator connection configured to connect at least one spring brake cylinder, and an inlet-outlet valve unit configured to assume at least a first switching position and a second switching position. The parking brake module further includes an electropneumatic pilot control unit configured to output at least a first control pressure at the inlet-outlet valve unit. In the first switching position of the inlet-outlet valve unit, the spring-type actuator connection is connected to the supply connection for outputting a spring brake pressure, and, in the second switching position of the inlet-outlet valve unit, the spring-type actuator connection is connected to a venting connection of the inlet-outlet valve unit. The inlet-outlet valve unit is in the second switching position when the first control pressure is below a first threshold value.

34 Claims, 4 Drawing Sheets

(51) Int. Cl.
  *B60T 13/26* (2006.01)
  *B60T 13/66* (2006.01)
  *B60T 17/22* (2006.01)
(52) U.S. Cl.
  CPC ......... *B60T 17/221* (2013.01); *B60Y 2400/81* (2013.01)

(56) References Cited

U.S. PATENT DOCUMENTS

| | | |
|---|---|---|
| 2011/0062774 A1 | 3/2011 | Bensch et al. |
| 2014/0103237 A1 | 4/2014 | Herges |
| 2022/0194340 A1* | 6/2022 | Schuppert ............. B60T 13/683 |

FOREIGN PATENT DOCUMENTS

| | | |
|---|---|---|
| DE | 102011101438 A1 | 11/2012 |
| DE | 102013004506 A1 | 10/2013 |
| DE | 102014006614 A1 | 11/2015 |
| EP | 1731394 A1 | 12/2006 |
| EP | 2129562 A2 | 12/2009 |
| EP | 2939892 A1 | 11/2015 |
| EP | 3112231 A1 | 1/2017 |
| JP | H11139301 A | 5/1999 |
| WO | WO 2006125615 A2 | 11/2006 |
| WO | WO 2008061799 A1 | 5/2008 |

* cited by examiner

ELECTROPNEUMATIC PARKING BRAKE MODULE WITH DIRECTLY CONTROLLED VALVES AND ANTI-COMPOUND CONNECTION

CROSS-REFERENCE TO PRIOR APPLICATIONS

This application is a U.S. National Phase Application under 35 U.S.C. § 371 of International Application No. PCT/EP2019/067193, filed on Jun. 27, 2019, and claims benefit to German Patent Application No. DE 10 2018 117 596.5, filed on Jul. 20, 2018. The International Application was published in German on Jan. 23, 2020 as WO 2020/015975 A1 under PCT Article 21(2).

FIELD

The invention relates to an electropneumatic parking brake module.

BACKGROUND

Such electropneumatic parking brake modules, also referred to as electropneumatic handbrake modules, serve to actuate what are known as parking brakes, in general spring brakes of a pneumatic brake system for a utility vehicle.

Spring brakes can be used as parking brakes and have a fault-prone brake actuator which activates the brake in a pressure-free manner so that the vehicle is correspondingly braked in the case of the pressure-free state. In order to release the spring brakes, these are acted upon with compressed air so that the spring brakes are released counter to the force of the spring.

Such electropneumatic parking brake modules therefore generally have a supply connection for connecting a compressed air supply, and at least one spring-type actuator connection for connecting at least one spring brake cylinder. It is conceivable in this case that all of the spring brake cylinders of the utility vehicle, in particular of the power car of a traction vehicle-trailer combination, are connected to a single spring-type actuator connection of the electropneumatic parking brake module. It is also possible that separate connections are provided for this purpose.

Such electropneumatic parking brake modules generally use a relay valve in order to supply the spring-type actuator connection and thus the spring brake cylinders with a volume-increased flow.

Such an electropneumatic parking brake module is disclosed, for example, in DE 103 36 611 A1. The relay valve is coupled to a pilot control unit which connects a control input of the relay valve to the supply connection via an electrically switched 2/2-way valve and a bistable 3/2-way valve. The electrically controlled 2/2-way valve serves the purpose of pulsed ventilation of the control input in order to use the spring-type actuators also for auxiliary braking or additional brake application. The bistable 3/2-way valve serves to maintain an aerated or vented state of the control input of the relay valve in order to maintain the state of the spring brake cylinders. In driving operation, a pressure should be permanently output at the spring-type actuator connection so that the spring brake cylinders are released. In the switched off state of the vehicle, however, the spring brake cylinders should be actuated, i.e. vented.

An electropneumatic parking brake module without a relay valve is disclosed in EP 2 129 562 B1. The device disclosed there solely uses a tristable solenoid valve which enables a direct connection of the supply connection to the connection for the spring brake cylinders. Such tristable solenoid valves are nevertheless extremely complex and very large, hence there is also the need here to provide a simpler solution.

An electropneumatic parking brake module is furthermore known from EP 2 939 892 A1, which module uses an electrically actuatable valve apparatus which has, proceeding from the supply connection, a branch between a pneumatic line for the parking brake cylinders and a pneumatic line for the connection of a trailer control valve (TCV). A control valve is connected to the pneumatic line for the spring brake cylinders, which control valve is formed as a 3/2-way valve and has both a pneumatic and an electric control input. EP 2 939 892 A1 thus dispenses with a pilot control unit. Nevertheless, dual-acting valves which have both a pneumatic and an electric control input are also complex and a simpler solution is furthermore desired.

DE 10 2014 006 614 A1 is known from the field of service brakes. A pneumatic brake apparatus for motor vehicles is disclosed there which has a brake signal transmitter, a supply pressure accumulator and a pneumatically operable wheel brake for each wheel as well as at least one axle of the motor vehicle with in each case one electrically actuatable wheel brake module for each wheel for adjusting a setpoint brake pressure of the respective wheel brake. An electronic control unit determines specified values of the setpoint brake pressures of the wheel brakes taking into account the brake signal transmitter. Each wheel brake module comprises at least one aeration valve and a ventilation valve, electrically actuatable activation means for activating the aeration valve and/or the ventilation valve as well as a control logic with means for generating an actuating signal for the activation means in accordance with the specified value for the setpoint brake pressure. In order to reduce the production costs and the size of the pneumatic brake apparatus, DE 10 2014 006 614 proposes that the aeration valve and its activation means are formed in such a manner that the pneumatic pressure can be fed through from the supply pressure accumulator in the activated state of the aeration valve directly to the respective wheel brake and/or the ventilation valve vents the brake pressure of the wheel brake in the activated state directly into the atmosphere.

A further issue in known parking brakes lies in releasing the spring brake in the case of a defective vehicle. Control systems of the vehicle typically permit the one-off activation of the parking brake when the vehicle is defective, in order for said vehicle to be securely parked. The spring brakes have to be released again when the vehicle is to be towed thereafter. This in most instances is performed manually by "turning back" the cylinders. Alternatively, in many systems it is also possible for the spring brakes to be vented in a targeted manner by pneumatic pressure, for example of the service brakes. In correspondingly conceived (downsized) brakes it can furthermore arise that permanent damage to the brakes arises when the forces for activating the service brake and the parking brake are added. In order for this to be prevented it is known for a corresponding anti-compound function in which the spring brake is released when the service brake is applied and/or vice versa to be implemented. The anti-compound function herein can be implemented in a "purely" pneumatic or an electropneumatic manner. Disadvantageous in the electropneumatic (SW-side) anti-compound function is the wake-up time in the parked state which potentially can already lead to a significant addition of forces and thus to damage to the brake.

SUMMARY

In an embodiment, the present invention provides an electropneumatic parking brake module. The electropneumatic parking brake module includes a supply connection configured to connect a compressed air supply, at least one spring-type actuator connection configured to connect at least one spring brake cylinder, and an inlet-outlet valve unit configured to assume at least a first switching position and a second switching position. The parking brake module further includes an electropneumatic pilot control unit configured to output at least a first control pressure at the inlet-outlet valve unit. In the first switching position of the inlet-outlet valve unit, the spring-type actuator connection is connected to the supply connection for outputting a spring brake pressure, and, in the second switching position of the inlet-outlet valve unit, the spring-type actuator connection is connected to a venting connection of the inlet-outlet valve unit. The inlet-outlet valve unit is in the second switching position when the first control pressure is below a first threshold value. A release control connection is further provided on which a release control pressure, which initiates the inlet-outlet valve unit to switch to the first switching position, is configured to be output by an external unit.

BRIEF DESCRIPTION OF THE DRAWINGS

The present disclosure will be described in even greater detail below based on the exemplary figures. The invention is not limited to the exemplary embodiments. All features described and/or illustrated herein can be used alone or combined in different combinations in embodiments of the invention. The features and advantages of various embodiments will become apparent by reading the following detailed description with reference to the attached drawings which illustrate the following.

DETAILED DESCRIPTION

The present disclosure provides an electropneumatic parking brake module of the type mentioned at the outset which can overcome at least one of the mentioned disadvantages and permits the spring brakes to be readily released in the parked state.

The present disclosure provides an electropneumatic parking brake module with the having a supply connection for connecting a compressed air supply, at least one spring-type actuator connection for connecting at least one spring brake cylinder, an inlet-outlet valve unit which can assume at least a first switching position and a second switching position, and an electropneumatic pilot control unit for outputting at least a first control pressure at the inlet-outlet valve unit. It is provided that, in the first switching position of the inlet-outlet valve unit, the spring-type actuator connection is connected to the supply connection for outputting a spring brake pressure, and, in the second switching position of the inlet-outlet valve unit, the spring-type actuator connection is connected to a venting connection of the inlet-outlet valve unit, and wherein the inlet-outlet valve unit is in the second switching position if the first control pressure is below a first threshold value. The electropneumatic parking brake module has a release control connection on which a release control pressure which initiates the inlet-outlet valve unit to switch to the first switching position is able to be output by an external unit.

A further, preferably fixedly installed, module within the vehicle can in particular be considered as an external unit, or a manual or semi-automatic service unit, respectively, which is able to be connected to the release control connection when required. It can be advantageous herein for an additional check valve to be provided on the release control connection so as to prevent the venting of the release control pressure and thus the switching of the inlet-outlet valve unit to the second switching position such that the spring brakes remain released. Such a check valve can preferably be screw-fitted when required. A valve of a tire filling connection is in particular to be considered as a check valve. In the case of manual venting, the latter would also offer a suitable coupling to an air source, for example for the tire pressure.

The release control pressure is preferably able to be selectively output for exerting an anti-compound function and/or an emergency release function. An anti-compound function is understood to be that the simultaneous application of the service brakes and the spring brakes on the same axle is to be prevented. This can be prevented by corresponding electrical signals, on the one hand. However, in the context of the present disclosure this is pneumatically implemented. This means that when the spring brakes are applied the spring brakes are to be released again when service brakes on the same axle are subsequently activated. In order for this to be implemented, a brake pressure line which outputs the service brake pressure of the respective axle, typically at least the rear axle, at the release control connection is preferably connected to the release pressure connection. Therefore, the release control pressure in one preferred embodiment is a service brake pressure of a rear axle of the vehicle.

According to one preferred refinement, the pilot control unit has a venting connection which for venting the first control pressure is connected to a release control line which leads to a release control connection. In this case, the release control connection also functions as a venting connection for the pilot control unit, or at least that part of the pilot control unit which is responsible for outputting the first control pressure. Consequently, the release control pressure connection in the normal operation thereof is preferably not provided with a check valve so as to enable unimpeded venting. However, said release control pressure connection can be provided with a silencer so as to dampen the noise in the normal operation. This silencer is preferably designed to be removable.

Conversely, this design embodiment also means that the release control pressure is able to be output by way of the venting connection of the pilot control unit for outputting the spring brake pressure at the spring brake connection. The venting path of the pilot control unit is thus used for venting the release control pressure. In this case, the release control pressure can thus replace the first control pressure, the former like the latter leading to the spring brake pressure being output.

In an alternative thereto, the electropneumatic parking brake module has a switch valve which is disposed between the pilot control unit and the inlet-outlet valve unit. The switch valve preferably receives the first control pressure from the pilot control unit at a first switch valve connection. A second switch valve connection is connected to the release control connection. Furthermore, a third switch valve connection is connected to the inlet-outlet valve unit and selectively relays the first pilot pressure or the release control pressure to said inlet-outlet valve unit. In this way, the venting connection of the pilot control unit does not have to be used as the release control connection, rather the switch valve can switch back and forth between the two inputs, i.e. the first control pressure from the pilot control unit and the release control pressure from the release control connection. The higher of the two pressures is in each case preferably provided at the third switch valve connection. For this purpose, the switch valve can be configured as a select-high valve which in each case relays the higher pressure prevailing on either the first or the second switch valve connection to the third switch valve connection. Said switch valve can however simply have a check valve connection at the second switch valve connection, said check valve connection closing off the release control connection and avoiding that the first control input is vented by way of the release control connection.

The inlet-outlet valve unit (main valve unit) preferably comprises at least one first pneumatically controlled 3/2-way valve having exactly two switching positions. The first control pressure is preferably output at this first pneumatically controlled 3/2-way valve by the pilot control unit. Furthermore, the release control pressure is preferably output at this first pneumatically controlled 3/2-way valve.

In this manner, an electropneumatic parking brake module is achieved which does not require a relay valve and manages with conventional, simple valves. The 3/2-way valve can replace a conventional relay valve. The inlet-outlet valve unit is preferably controlled purely pneumatically, while the pilot control unit is controlled electromagnetically. The pilot control unit as such can be formed in general as described in DE 10 2014 006 614 A1. The pilot control unit therefore serves to output the first control pressure, wherein, depending on the first control pressure, the inlet-outlet valve unit supplies the spring-type actuator connection with a volume or ventilates it. The two defined switching positions of the 3/2-way valve are used here. The 3/2-way valve preferably serves both to aerate and ventilate the spring-type actuator connection.

According to the present disclosure, it is furthermore provided that the inlet-outlet valve unit is in the second switching position if the first control pressure is below a first threshold value. The same preferably also applies for the release control pressure. The threshold value is predetermined and structurally defined by the inlet-outlet valve unit. A typical threshold value lies in the region of 0.25 MPa, but can be freely defined and selected in accordance with the respective requirements of the brake system in which the electropneumatic parking brake module is supposed to be used. In this manner, it is ensured that if no first control pressure can be output, this therefore lies below the first threshold value, the spring-type actuator connected is vented and the spring brake cylinders can thus be actuated. This is advantageous particularly if the pilot control unit is formed so that it does not output any first control pressure in the currentless state.

In the first switching position of the inlet-outlet valve unit, the spring brake pressure can preferably be fed through directly from the supply connection to the spring-type actuator connection. In the present case, direct feeding through refers to the production of a volume connection between the supply connection and the spring-type actuator connection, without the interconnection of a relay valve. Therefore, not only is a control pressure output by the inlet-outlet valve unit, rather a volume-increased flow for venting the spring-type actuator connection is directly provided.

In one preferred embodiment, it is provided that the inlet-outlet valve unit has at least one 2/2-way check valve. The 2/2-way check valve preferably serves the purpose of graduated aeration or ventilation of the spring-type actuator connection. By means of a graduated venting of the spring-type actuator connection, graduated brake application can be brought about by the spring brake cylinders and the spring brake cylinders can thus be used for additional braking or auxiliary braking of the vehicle. For this reason, the 2/2-way check valve is only optional.

The first 3/2-way valve is preferably controlled pneumatically. The pilot control unit is preferably formed to provide the first control pressure at the first 3/2-way valve. The 2/2-way check valve is preferably also controlled pneumatically. In one alternative, the 2/2-way check valve is formed electromagnetically. In the event that the 2/2-way check valve is formed to be pneumatically controlled, it is preferably provided that the pilot control unit provides a second control pressure at the 2/2-way check valve.

In one preferred further development, the first 3/2-way valve has an inlet connection, a working connection and a venting connection and the first 3/2-way valve is formed to reciprocally connect the working connection to the inlet connection and the venting connection. A supply pressure can preferably be output at the input connection. The input connection is preferably connected to the supply connection.

In one preferred further development, a non-return valve is arranged between the supply connection and the input connection in order to prevent a return flow from the spring-type actuator connection to the supply connection. As a result of this, it is possible to maintain a control pressure, in particular the first control pressure, even if the pressure at the supply connection drops, for example, as a result of a fault in the compressed air supply which leads to a drop in the pressure in the compressed air supply.

If, however, no non-return valve is used, it is possible to achieve an actuation of the spring brake cylinders despite the presence of the first control pressure in that the corresponding brake circuit is pumped down, i.e. the pressure in the compressed air supply is reduced and thus the present supply pressure is reduced. In this case, even if the spring-type actuator connection is connected directly to the supply connection, the spring-type actuator connection is vented through opened valves via a pumping down of the supply connection and thus the spring brake cylinders are actuated.

It is furthermore preferred that the 2/2-way check valve has a first check valve connection and a second check valve connection, wherein the first check valve connection is connected to the working connection of the first 3/2-way valve, and the second check valve connection is connected to the spring-type actuator connection. The 2/2-way check valve is therefore connected between the first 3/2-way valve and the spring-type actuator connection. For graduated aeration and ventilation, the first 3/2-way valve can then be moved into a position which connects the spring-type actuator connection to an aeration or ventilation and this connection is produced by pulsed actuation of the 2/2-way check valve. The 2/2-way check valve is preferably formed as a pneumatically controlled 2/2-way check valve, wherein it is in the open switching position if the second control pressure undershoots a second threshold value.

In one preferred further development, the electropneumatic pilot control unit has at least one second 3/2-way valve, wherein the second 3/2-way valve is provided to output the first control pressure. To this end, the second 3/2-way valve can preferably be switched between a first and a second switching position, wherein no control pressure is output in the first switching position, i.e. the corresponding input of the inlet-outlet valve unit for the first control pressure is connected to a vent, and, in a second switching position, the first control pressure is output, i.e. the corresponding input of the inlet-outlet valve unit is connected to the supply connection.

In one preferred embodiment, the second 3/2-way valve is formed as a bistable valve. In the case of the bistable valve, both the first and the second switching positions are in each case stable in a currentless state and are preferably retained by a permanent magnet. In the event of the omission of a voltage or current, such a bistable valve does not fall back into a switching position under spring load, but rather sticks in the last switching position occupied as a result of the permanent magnets. An occupied switching position can therefore be maintained by such a bistable valve, also in a currentless state, and the output first control pressure can thus be maintained in a currentless state.

The bistable valve preferably has a first bistable valve connection, a second bistable valve connection and a third bistable valve connection, wherein the first bistable valve connection is connected to the supply connection, the second bistable valve connection outputs the first control pressure and the first control pressure is able to be vented via the third bistable valve connection. To this end, the third bistable valve connection is preferably connected, or able to be connected, to a vent, or to the release pressure connection, respectively. The second bistable valve connection by means of a first pneumatic control line is preferably connected, or able to be connected, to a first control input of the first 3/2-way valve.

In a further embodiment, the release control pressure is able to be output directly into the first pneumatic control line. In this embodiment, the release control pressure is not provided by way of the bistable valve at the inlet-outlet valve unit, rather it is introduced into the first pneumatic control line, thus between the bistable valve and the first 3/2-way valve. This can take place in particular by way of a branch line, a T-fitting, or a valve which is inserted into the first pneumatic line.

In this variant in which the pilot control unit has a bistable valve, the switch valve is preferably disposed between the bistable valve and the first 3/2-way valve. It is preferably provided herein that the first switch valve connection is connected to the second bistable valve connection, and the third switch valve connection is connected to the first control input. A particularly simple input of the release control pressure into the first pneumatic control line by way of the switch valve is possible in this way.

In further embodiments, it is also possible to combine the bistable valve by a combination of monostable switching valves as well as a pneumatic self-retention in order to ensure maintenance of the output first control pressure.

Insofar as it is provided in a further embodiment that the electropneumatic pilot control unit has a monostable inlet-outlet valve combination with an inlet valve and an outlet valve for outputting the first control pressure. The first control pressure can initially be output by means of the monostable inlet-outlet valve combination by providing corresponding switching signals. In order to maintain this in a currentless state, a return line is preferably provided which provides the pressure output by the first 3/2-way valve as a first control pressure at the inlet-outlet valve unit. As soon as the first control pressure is output by means of the monostable inlet-outlet valve combination, the first 3/2-way valve switches upon exceeding of a corresponding threshold value and outputs a pressure. By returning the output pressure as a first control pressure, the switching position achieved in this manner of the 3/2-way valve can be maintained and self-retention can be achieved. A bistable valve is no longer necessary in this variant, as a result of which the costs and the installation space for the electropneumatic parking brake module can be reduced.

The pressure output by the 3/2-way valve is preferably provided as a first control pressure in a throttled manner at the inlet-outlet valve unit. The return line preferably has a throttle for this purpose.

In a first variant, the inlet valve has in this case a first inlet valve connection connected to the supply connection and a second inlet valve connection connected to the inlet-outlet valve unit, wherein the first control pressure can be output at the second inlet valve connection by switching the inlet valve. The second inlet valve connection is preferably connected via a first pneumatic control line to the first 3/2-way valve, more precisely to the first control input of the first 3/2-way valve. The inlet valve can in this case be formed either as a 2/2-way valve or as a 3/2-way valve. It is preferably formed as a 2/2-way valve and is currentless in the first, closed switching position.

It is furthermore preferred that the outlet valve has a first outlet valve connection connected to the inlet-outlet valve unit and a second outlet valve connection connected to a vent for venting the first control pressure. In order to move the first 3/2-way valve back into the venting position so that no spring brake pressure is output, it is necessary to ventilate the first control input of the first 3/2-way valve. The outlet valve which can be formed according to this embodiment as a 2/2-way valve or as a 3/2-way valve serves this purpose. The outlet valve is preferably currentless in a closed switching position if it is formed as a 2/2-way valve. The first outlet valve connection can be connected to the same first pneumatic control line as the inlet valve. A branch or a branch line can be provided for this purpose.

In one preferred further development, the return line is connected directly to the inlet-outlet valve unit. This is advantageous in particular if both the inlet valve and the outlet valve are formed as 2/2-way valves. In this variant, the return line consequently branches off directly from the second pneumatic line, which is connected to the working connection of the first 3/2-way valve and leads directly to the first control input of the first 3/2-way valve. To this end, it can discharge into the first pneumatic control line. In this variant, the pressure output by the first 3/2-way valve is provided directly and without the interconnection of a valve at the first control input of the first 3/2-way valve irrespective of the switching position of the inlet valve or of the outlet valve. A blocking-out of the returned pressure is not possible here. In order to be able to block out the returned pressure, either a further valve is required, or the inlet or outlet valve is to be formed as a 3/2-way valve.

It is accordingly provided in a further variant that the inlet valve has a third inlet valve connection connected to the return line, wherein, in a first switching position of the inlet valve, the second inlet valve connection is connected to the first inlet valve connection, and, in a second switching position of the inlet valve, the second inlet valve connection is connected to the third inlet valve connection. In this embodiment, the inlet valve is formed as a 3/2-way switching valve. The inlet valve formed as a 3/2-way valve is preferably currentless in the second switching position so that in a currentless state the returned pressure is provided as a first control pressure at the first control input of the first 3/2-way valve. Self-retention of the first 3/2-way valve is thus achieved in a currentless state.

Alternatively to this, it is also possible to form the outlet valve as a 3/2-way valve. In this variant, the outlet valve has a third outlet valve connection connected to the return line, wherein, in a first switching position of the outlet valve, the first outlet valve connection is connected to the third outlet valve connection and, in a second switching position of the outlet valve, the first outlet valve connection is connected to the second outlet valve connection. The outlet valve is preferably currentless in the first switching position so that the pressure output by the first 3/2-way valve is returned via the return line in a currentless state and is output as a first control pressure at the first control input of the first 3/2-way valve. In this manner, self-retention is achieved in a currentless state.

In these variants, in which the pilot control unit is configured so as to be monostable, the switch valve is preferably disposed between the inlet valve and the first 3/2-way valve. In this instance, the first switch valve connection is preferably connected to the second inlet valve connection, and the third switch valve connection is preferably connected to the first control input. A particularly simple input of the release control pressure into the first pneumatic control line for implementing an anti-compound function is enabled on account thereof.

In the further preferred embodiment, the electropneumatic pilot control unit has at least one third 3/2-way valve for outputting a second control pressure. For this purpose, the third 3/2-way valve has an inlet connection, a working connection and a venting connection, and the third 3/2-way valve is formed to reciprocally connect the working connection to the inlet connection and the venting connection. The third 3/2-way valve is preferably formed as an electronically switched valve. In a first switching position, the input connection is preferably connected to the working connection and, in a second switching position, the venting connection is connected to the working connection. The third 3/2-way valve is preferably currentless in the second switching position.

It is furthermore preferred that the inlet connection of the third 3/2-way valve is connected to the supply connection, the working connection of the third 3/2-way valve is connected to a second control input of the 2/2-way check valve and the venting connection of the third 3/2-way valve is connected to a vent. In this case, in the currentless state, no second control pressure is output and the 2/2-way check valve is preferably in the open switching position if the second control pressure undershoots the second threshold value. A pressure in the region of approximately 0.25 MPa is in turn possible as a second threshold value, wherein other threshold values can also be used here.

In order therefore to transfer a control pressure to a trailer control valve (TCV), which control pressure corresponds to the spring brake pressure at the spring-type actuator connection, the electropneumatic parking brake module according to this embodiment has the trailer control valve connection.

The electropneumatic parking brake module preferably has a trailer valve which is connected to the trailer control valve connection and which is provided, in a first switching position, to output at least the spring brake pressure as the trailer control pressure at the trailer control connection. Alternatively, it is also possible to output another equivalent pressure at the trailer control valve connection.

The spring brake pressure is preferably provided directly at the trailer control valve connection, i.e. without inversion. The trailer control valve (TCV) connected to the trailer control valve connection must then invert the output pressure in order to provide a corresponding service brake pressure at the service brakes of the trailer.

The trailer valve preferably has a second switching position which is provided to perform a trailer control position function. In the trailer control position, there is a check in the European trailer control as to whether the trailer-towing vehicle combination is held securely even without engaged service brakes of the trailer only as a result of the spring brake cylinders of the towing vehicle. In order to achieve this state, it is consequently necessary to output a pressure at the trailer control valve connection if the spring-type actuator connection is vented. The trailer control valve connected to the trailer control valve connection inverts the output pressure and thus leaves the service brakes of the trailer in a depressurized state, i.e. in an open state. The trailer control position function is only performed temporarily and is generally activated from the vehicle cabin. The vehicle driver actuates the trailer control position function in order to check the secure holding of the towing vehicle trailer combination. If it is ascertained that the towing vehicle trailer combination is securely held, the trailer control position function is terminated and the trailer valve is correspondingly moved into the first switching position so that in turn the spring brake pressure is output as the trailer control pressure at the trailer control valve connection.

In a further preferred embodiment, the trailer valve is formed as a fourth 3/2-way valve and has a first trailer valve connection, a second trailer valve connection and a third trailer valve connection, wherein the first trailer valve connection is connected to the supply connection, the second trailer valve connection is connected to the trailer control valve connection and the third trailer valve connection is connected to a branch line which branches off from a spring brake pressure line connected to the spring-type actuator connection.

It is furthermore preferred that the trailer valve is in a currentless position in the first switching position or the second switching position. In the case that the trailer valve is currentless in the first switching position, the electropneumatic parking brake module is formed for European trailer control. In the case that the trailer valve is currentless in the second switching position, the electropneumatic parking brake module is formed for Scandinavian trailer control. In the second variant, the supply pressure is output in a currentless state at the trailer control valve connection so that, in a currentless state, the service brakes of the trailer are not applied.

It is furthermore preferred that the electropneumatic parking brake module has an electric control unit with an electric connection for receiving parking brake signals and for providing corresponding switching signals at least to the pilot control unit. The electric connection for receiving parking brake signals can be connected, for example, to a vehicle bus or directly via cabling to a parking brake switch or handbrake switch in a driver's cabin of the vehicle.

It is further preferred that the electropneumatic parking brake module has a pressure sensor which is provided to detect the spring brake pressure and provide a corresponding signal. The pressure sensor preferably provides the signal at the electric control unit. The electric control unit can transfer the signal to a vehicle bus or the like, or independently process it. It is possible to determine via the signal detected by the pressure sensor whether the spring brake cylinders are actuated or open.

An electropneumatic parking brake module 1 (FIG. 1) has, according to the embodiment, a supply connection 2 to which a compressed air supply 3 is connected. Compressed air supply 3 is part of a brake system of a utility vehicle which is not represented further here. In particular, compressed air supply 3 is part of a parking brake circuit.

Figure 1:
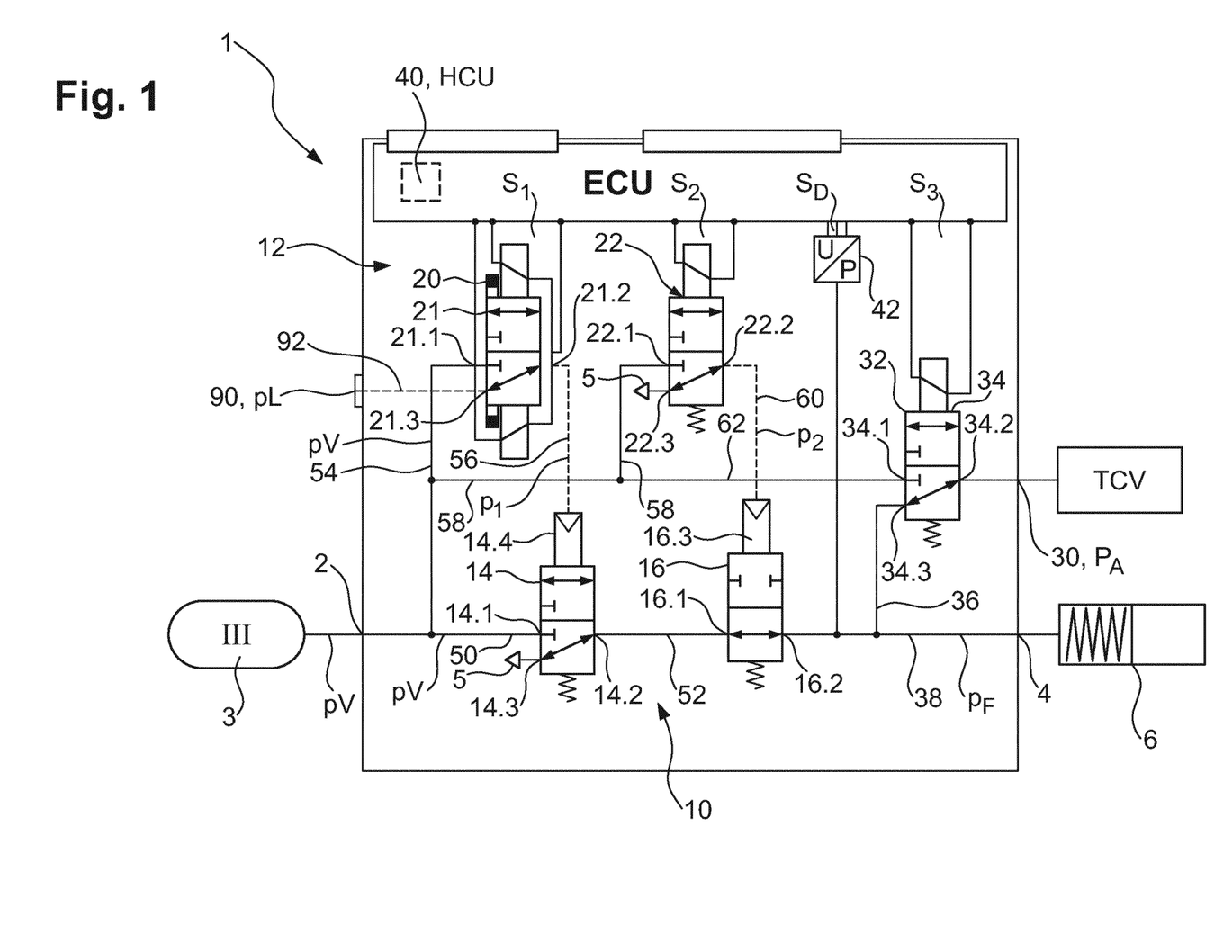
FIG. 1 shows a block diagram of an electropneumatic parking brake module according to a first exemplary embodiment.

Electropneumatic parking brake module 1 furthermore has a spring-type actuator connection 4 to which a spring brake cylinder 6 is connected according to this exemplary embodiment. It should be understood that it is also possible to connect two or more, in particular four or more spring brake cylinders to spring-type actuator connection 4.

A supply pressure pV is provided at electropneumatic parking brake module 1 via supply connection 2 and a spring brake pressure pF is provided to spring-type actuator connection 4 via spring-type actuator connection 4. Spring-type actuators 6 are formed so that they are actuated as a result of a spring force so that a positive spring brake pressure pF is required to release spring brake cylinders 6. In the case of omission of spring brake pressure pF or undershooting of a threshold value, the spring brake cylinders are partially or fully actuated.

In order, proceeding from supply connection 2, to output spring brake pressure pF at spring-type actuator connection 4, electropneumatic parking brake module 1 has an inlet-outlet valve unit 10 and an electropneumatic pilot control unit 12. Inlet-outlet valve unit 10 can be switched so that spring brake pressure pF can be directly fed through from supply connection 2 to spring-type actuator connection 4. This is described in even greater detail below. For this purpose, in one switching position of inlet-outlet valve unit 10, spring-type actuator connection 4 is connected directly to supply connection 2. In a second switching position of inlet-outlet valve unit 10, spring-type actuator connection 4 is however connected to a vent 5 in order to enable an actuation of spring brake cylinders 6.

Inlet-outlet valve unit 10 is pneumatically controlled and can be switched on the basis of a first control pressure p1. Insofar as first control pressure p1 lies below a first predetermined threshold value, for example, 0.25 MPa, the inlet-outlet valve unit switches into the second switching position in which spring-type actuator connection 4 can be vented and thus spring brake cylinders 6 are actuated.

In detail, inlet-outlet valve unit 10 initially has for this purpose a first 3/2-way valve 14 which is pneumatically controllable and has an input connection 14.1, a working connection 14.2, a venting connection 14.3 and a first control input 14.4. Inlet connection 14.1 of first 3/2-way valve 14 is connected via a first pneumatic line 50 to supply connection 2. Venting connection 14.3 of first 3/2-way valve 14 is connected to a vent 5 which can be a central vent 5 of electropneumatic parking brake module 1. Working connection 14.2 of first 3/2-way valve 14 is connected to a pneumatic line 52. First 3/2-way valve 14 has a first switching position, not occupied in FIG. 1, in which inlet connection 14.1 of first 3/2-way valve 14 is connected to working connection 14.2 of first 3/2-way valve 14. First 3/2-way valve 14 furthermore has a second switching position which is occupied in FIG. 1 and in which venting connection 14.3 of the first 3/2-way valve is connected to working connection 14.2 of first 3/2-way valve 14. In this second switching position, working connection 14.2 of first 3/2-way valve 14 and thus also pneumatic line 52 can be vented. First 3/2-way valve 14 is pretensioned in a spring-loaded manner into the second switching position. By corresponding application of first control pressure p1 at first control input 14.4 of first 3/2-way valve 14, first 3/2-way valve 14 can be transferred into the first switching position, not shown, in order to output supply pressure pV in pneumatic line 52.

In the exemplary embodiment shown in FIG. 1, second pneumatic line 52 is connected to a first check valve connection 16.1 of a 2/2-way check valve 16. Second check valve connection 16.2 of 2/2-way check valve 16 is connected to a spring brake pressure line 38 which itself is connected to spring-type actuator connection 4. That means that working connection 14.2 of first 3/2-way valve 14 is ultimately connected to spring-type actuator connection 4 if 2/2-way check valve 16 is in the opening switching position shown in FIG. 1. 2/2-way check valve 16 is part of inlet-outlet valve unit 10 and is also pneumatically controlled like first 3/2-way valve 14. 2/2-way check valve 16 is pretensioned in a spring-loaded manner into the second open switching position shown in FIG. 1. 2/2-way check valve 16 has a second control connection 16.3 at which a second control pressure p2 can be output.

It should be understood that there can also be embodiments which do not use a 2/2-way check valve 16, rather in the case of which spring brake pressure line 38 is connected directly to working connection 14.2 of the first 3/2-way valve.

2/2-way check valve 16 primarily serves the purpose of graduated aeration and ventilation of spring-type actuator connection 4. If first 3/2-way valve 14 is in the second switching position shown in FIG. 1, first check valve connection 16.1 is connected to vent 5. If 2/2-way check valve 16 is now moved into the first switching position not shown in FIG. 1, spring-type actuator connection 4 is not vented despite the switching of first 3/2-way valve 14 into the second switching position shown in FIG. 1. It is only upon switching of 2/2-way check valve 16 into the second switching position shown in FIG. 1 that spring-type actuator connection 4 would be vented. For example, for the purpose of auxiliary braking, 2/2-way check valve 16 can now be moved in a pulsed manner from the first switching position, not shown in FIG. 1, into the second switching position shown in FIG. 1 in order to vent spring-type actuator connection 4 in a graduated manner and partially and temporarily actuate spring brake cylinders 6.

Electropneumatic pilot control unit 12 serves to output at least first control pressure p1 and provide it at inlet/outlet valve unit 10 in order to cause inlet/outlet valve unit 10 to switch and output a corresponding spring brake pressure pF at spring-type actuator connection 4. To be more precise, by outputting first control pressure p1, pilot control unit 12 causes first 3/2-way valve 14 to change from the second switching position into the first switching position if output first control pressure p1 assumes or exceeds the first defined threshold value. Insofar as electropneumatic parking brake module 1 has a 2/2-way check valve 16, and insofar as this 2/2-way check valve 16 is formed to be pneumatically controlled, electropneumatic pilot control unit 12 is preferably also formed to output second control pressure p2 and output it at inlet-outlet valve unit 10, preferably at second control input 16.3 of 2/2-way check valve 16.

For this purpose, electropneumatic pilot control unit 12 firstly has a second 3/2-way valve 20 which is connected to supply connection 2 for outputting first control pressure p1.

To be more precise, second 3/2-way valve 20 is formed in this embodiment as bistable valve 21 and has a first bistable valve connection 21.1, a second bistable valve connection 21.2 and a third bistable valve connection 21.3. Bistable valve 21 has a first switching position, not shown in FIG. 1, in which first bistable valve connection 21.1 is connected to second bistable valve connection 21.2, and a second switching position, shown in FIG. 1, in which second bistable valve connection 21.2 is connected to third bistable valve connection 21.3. First bistable valve connection 21.1 is connected to supply connection 2. To be more precise, first bistable valve connection 21.1 is connected via a third pneumatic line 54 to supply connection 2, wherein third pneumatic line 54 branches off from first pneumatic line 50. In this respect, supply pressure pV is present at first bistable valve connection 21.1. Second bistable valve connection 21.2 is in contrast connected to a first pneumatic control line 56 into which first pneumatic control pressure p1 is output. On the other hand, first pneumatic control line 56 is connected to first control input 14.4 of first 3/2-way valve 14.

Bistable valve 21 is formed so that it is stable both in the first switching position, not shown in FIG. 1, and in the second switching position shown in FIG. 1. This is achieved by a permanent magnet which correspondingly holds the valve armature in the switching positions. This means that bistable valve 21 can remain currentless both in the first and in the second switching position.

In the case where applied spring brakes 6 are to be released without outputting, or being able to output, the first control pressure p1, the electropneumatic parking brake module 1 according to the present disclosure has a release control connection 90. In the embodiment shown in FIG. 1, the third bistable valve connection 21.3 is connected to the release control connection 90, specifically by way of a release control line 92 in this exemplary embodiment. The release control connection 90 in this embodiment also assumes the function of venting so as to vent the first pneumatic control line 56 and thus the first pneumatic control connection 14.4 when the bistable valve 21 is in the switching position shown in FIG. 1.

Now, in order for the spring brakes 6 to be able to be released, thus vented, in the event of a failure of the electronic control unit ECU, a release control pressure pL can be output at the release control connection 90. This can take place manually in that a compressed-air vessel is connected by a service operator or the driver of the vehicle. Prior thereto, a check valve can be screw-fitted in the release control connection 90. To this end, the release control connection 90 preferably has a corresponding thread. The release control connection 90 in the normal operation thereof can also be provided with a silencer which in this instance is removed before the compressed-air vessel is connected, or the check valve is screw-fitted, respectively.

According to this exemplary embodiment, the venting path of the first control connection 14.4 of the first 3/2-way valve 14 is also used for outputting the release control pressure pL.

In order to output second control pressure p2, electropneumatic pilot control unit 12 has according to this exemplary embodiment a third 3/2-way valve 22. Third 3/2-way valve 22 is connected to supply connection 2, a vent 5 and second control input 16.3 of 2/2-way check valve 16.

In detail, third 3/2-way valve 22 has an inlet connection 22.1, a working connection 22.2 as well as a venting connection 22.3. Inlet connection 22.1 of third 3/2-way valve 22 is connected to a fourth pneumatic line 58. Third pneumatic line 58 branches off from second pneumatic line 54. This means that supply pressure pV is also present at inlet connection 22.1 of third 3/2-way valve 22.

Working connection 22.2 of third 3/2-way valve 22 is connected to a second pneumatic control line 60 which itself leads to second control input 16.3 of 2/2-way check valve 16. Second control pressure p2 is consequently output at working connection 22.2 of third 3/2-way valve 22. Venting connection 22.3 of third 3/2-way valve 22 is connected to a vent 5, in particular the central joint vent of electropneumatic parking brake module 1.

Electropneumatic parking brake module 1 has an electric control unit ECU. Electric control unit ECU is provided to provide an actuating signal 51 at the second 3/2-way valve, in particular bistable valve 21, in order to switch it between the first and second switching positions. Electric control unit ECU is furthermore formed to provide a second actuating signal S2 at third 3/2-way valve 22 in order to move third 3/2-way valve 22 from the second switching position shown in FIG. 1 into the first switching position, not shown in FIG. 1. In the first switching position, not shown in FIG. 1, inlet connection 22.1 of third 3/2-way valve 22 is connected to working connection 22.2 of third 3/2-way valve 22 so that second control pressure p2 is output and subsequently, upon exceeding of the second threshold value, switches 2/2-way check valve 16 and thus shuts off second check valve connection 16.2 from first check valve connection 16.1.

Electric control unit ECU furthermore has an electronic connection 40 to which at least one vehicle bus or an HCU switch can be directly connected. If, for example, a vehicle which has electromagnetic parking brake module 1 is started, a signal is preferably provided at electronic connection 40 that spring brake cylinders 6 should be released. Electric control unit ECU generates, on the basis of the received signal, signal S1 and switches second 3/2-way valve 20 into the first switching position, not shown, in order to output first control pressure p1 so that first 3/2-way valve 14 is also switched into the second switching position, not shown, in order to output spring brake pressure pF so that spring-type actuator connection 4 is aerated. Spring brake cylinders 6 connected to spring-type actuator connection 4 are consequently aerated and released. The vehicle can begin to move.

Second signal S2 is triggered on the basis of auxiliary braking requirement signals received via electronic connection 40 and serves to switch third 3/2-way valve 22 and as a result 2/2-way check valve 16 in order to ventilate spring brake cylinders 6 which are connected to spring-type actuator connection 4 in a graduated manner.

The first embodiment shown in FIG. 1 of electropneumatic parking brake module 1 also enables a trailer control position function.

In the case of towing vehicle-trailer combinations, it is preferred that the service brakes of the trailer are braked in coordination with spring brake cylinders 6 of the towing vehicle. In this case, a differentiation is made in principle between what is known as European trailer control and what is known as Scandinavian trailer control. While in the case of European trailer control, the service brakes of the trailer should be permanently applied in the parked state of the vehicle, in the case of Scandinavian trailer control, it is required that, in the parked state of the towing vehicle-trailer combination, the service brakes of the trailer are released in order to prevent freezing. It is nevertheless also required in the case of Scandinavian trailer control that the service brakes of the trailer are also applied for other cases in which spring brake cylinders 6 of the towing vehicle are activated, i.e. actuated.

For this purpose, electropneumatic parking brake module 1 according to this embodiment has a trailer control valve connection 30 as well as a trailer valve 32. A trailer control pressure pA which corresponds to spring brake pressure pF or is an equivalent pressure to this is output at trailer control valve connection 30. A trailer control valve TCV which inverts provided trailer control pressure pA and then outputs it inversely at service brakes of a trailer (not shown) can be connected to trailer control valve connection 30.

Trailer valve 32 serves to implement the trailer control position function. For this purpose, trailer valve 32, in this embodiment (FIG. 1), is formed as fourth 3/2-way valve 34 and has a first trailer valve connection 34.1, a second trailer valve connection 34.2 and a third trailer valve connection 34.3. In a first switching position, not shown in FIG. 1, first trailer valve connection 34.1 is connected to second trailer valve connection 34.2. In a second switching position shown in FIG. 1, second trailer valve connection 34.2 is connected to third trailer valve connection 34.3. The first trailer valve connection is connected to a fourth pneumatic line 62 which branches off from third pneumatic line 58. In this regard, supply pressure pV is present at first trailer valve connection 34.1. Second trailer valve connection 34.2 is connected to trailer valve connection 30. Third trailer valve connection 34.3 is connected via a branch line 36 to spring brake pressure line 38 into which spring brake pressure pF is output. This means that spring brake pressure pF is present at third trailer valve connection 34.3.

Either supply pressure pV or spring brake pressure pF can now be output by means of trailer valve 32 at trailer control valve connection 30. In the event that spring brake pressure pF is output as trailer control pressure PA, the service brakes of the trailer vehicle are controlled in coordination with spring brake cylinders 6. This means that, if spring brake cylinders 6 are actuated, the service brakes of the trailer are also actuated. In order to prevent this, trailer valve 32 can be moved into the first switching position by means of a third signal S3 by electric control unit ECU so that supply pressure pV is output at trailer control valve connection 30 as trailer control pressure PA. In this case, the service brakes of the trailer vehicle remain released.

The exemplary embodiment shown in FIG. 1 uses a trailer valve 32 which is currentless in the second switching position shown in FIG. 1 and thus outputs spring brake pressure pF as trailer control pressure pA in a currentless state. The exemplary embodiment shown in FIG. 1 thus implements European trailer control in which, in a parked state of the vehicle (currentless state), the trailer is braked in coordination with spring brake cylinders 6 of the towing vehicle.

Figure 2:
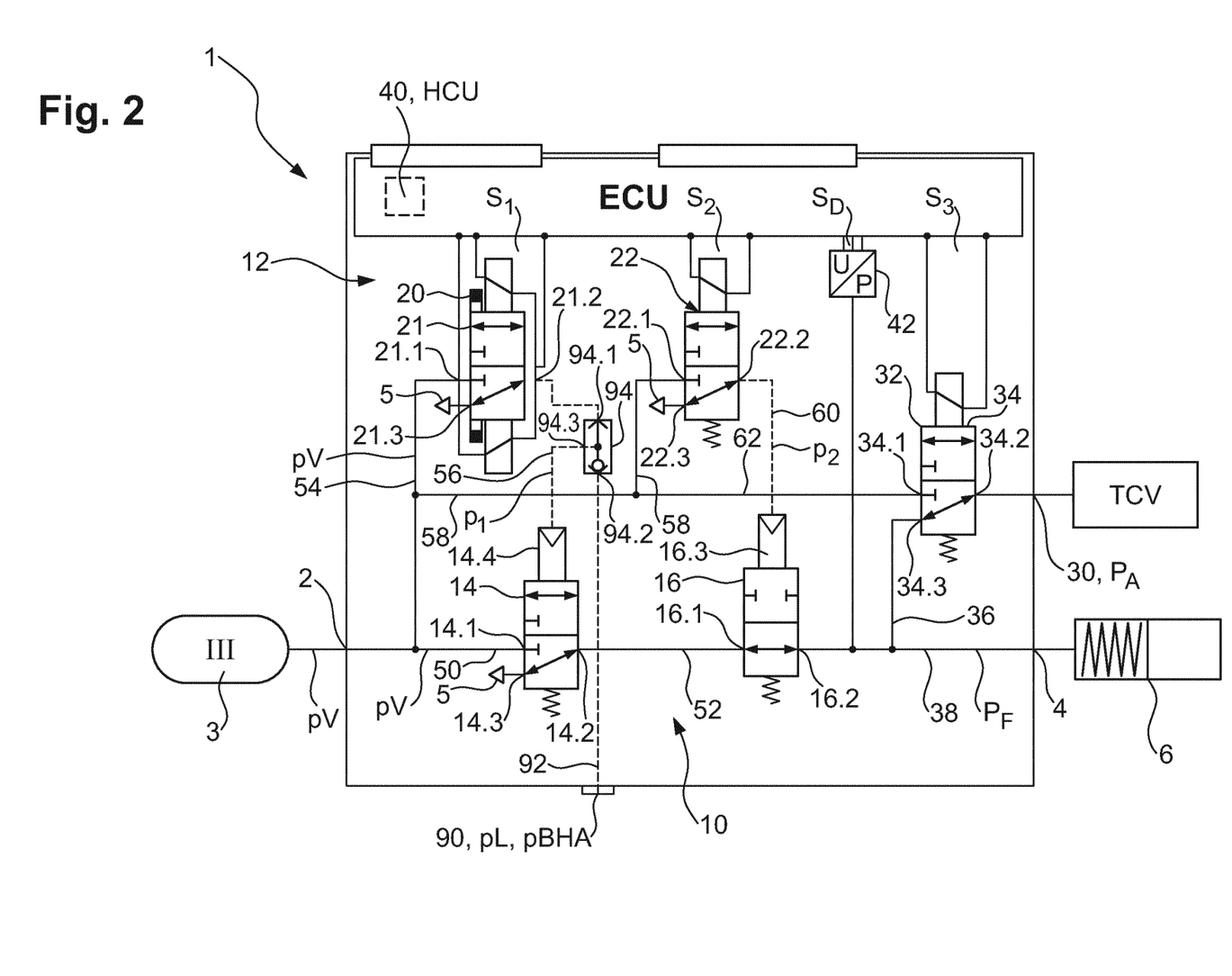
FIG. 2 shows a block diagram of an electropneumatic parking brake module according to a second exemplary embodiment.

FIG. 2 shows a further exemplary embodiment of the electropneumatic parking brake module 1, wherein identical and similar elements are provided with the same reference signs in FIGS. 1 and 2. To this end, reference is comprehensively made to the above description pertaining to the first exemplary embodiment. The points of differentiation in comparison to the first exemplary embodiment (FIG. 1) will be highlighted and explained in particular hereunder.

The electropneumatic parking brake module 1 of the second exemplary embodiment (FIG. 2), like the electropneumatic parking brake module 1 of the first exemplary embodiment, has a release control connection 90 which in the interior of the electropneumatic parking brake module 1 is connected to a release control line 92. However, the latter is not connected to the third bistable valve connection 21.3. Rather, the third bistable valve connection 21.3 in this exemplary embodiment (FIG. 2) is connected, or able to be connected, to a vent 5.

In this embodiment (FIG. 2) the release control pressure pL is output directly into the first pneumatic control line 56. In order for this to be simplified, a switch valve 94 which is disposed between the bistable valve 21 and the first 3/2-way valve 14, more specifically is inserted into the first pneumatic control line 56, is provided. The switch valve 94 has a first switch valve connection 94.1, a second switch valve connection 94.2, and a third switch valve connection 94.3. The first switch valve connection 94.1 by way of a first portion of the first pneumatic control line 56 is connected to the second bistable valve connection 21.2. The second switch valve connection 94.2 is connected to the release control line 92. The third switch valve connection 94.3 by way of a second portion of the first pneumatic control line 56 is connected to the first control input 14.4 of the first 3/2-way valve 14. The switch valve 94 is configured such that the connection between the first switch valve connection 94.1 and the third switch valve connection 94.3 is open in the normal operation. The second switch valve connection 94.2 is opened only once the release control pressure pL exceeds a specific threshold value, the first switch valve connection 94.1 being conversely closed. The release control pressure pL can in this way also be output to the first control connection 14.4 by way of the switch valve 14.4 so as to switch the first 3/2-way valve 14 and to thus output the spring brake pressure pF at the spring-type actuator connection 4.

While the first exemplary embodiment is suitable only for emergency release function purposes because the release control connection 90 in the normal operation is required for venting the bistable valve 21, the electropneumatic parking brake module 1 according to the second exemplary embodiment can also be used in the context of an anti-compound circuit in which a control line is (permanently) connected to the release control connection 90, said control line at said release control connection 90 outputting a service brake pressure pBHA to an axle, for example a rear axle, which is provided with spring brakes 6. It can be avoided in this way that the service brakes as well as the spring brakes 6 on this axle are simultaneously applied. Blocking of the respective axle can be avoided on account thereof. Alternatively or additionally, the release control connection 90 in the second exemplary embodiment can however also be used for an emergency release function.

In a variant not illustrated, an additional check valve is provided directly downstream of the supply connection 2 so as to avoid any flow of fluid back to the supply connection 2.

Figure 3:
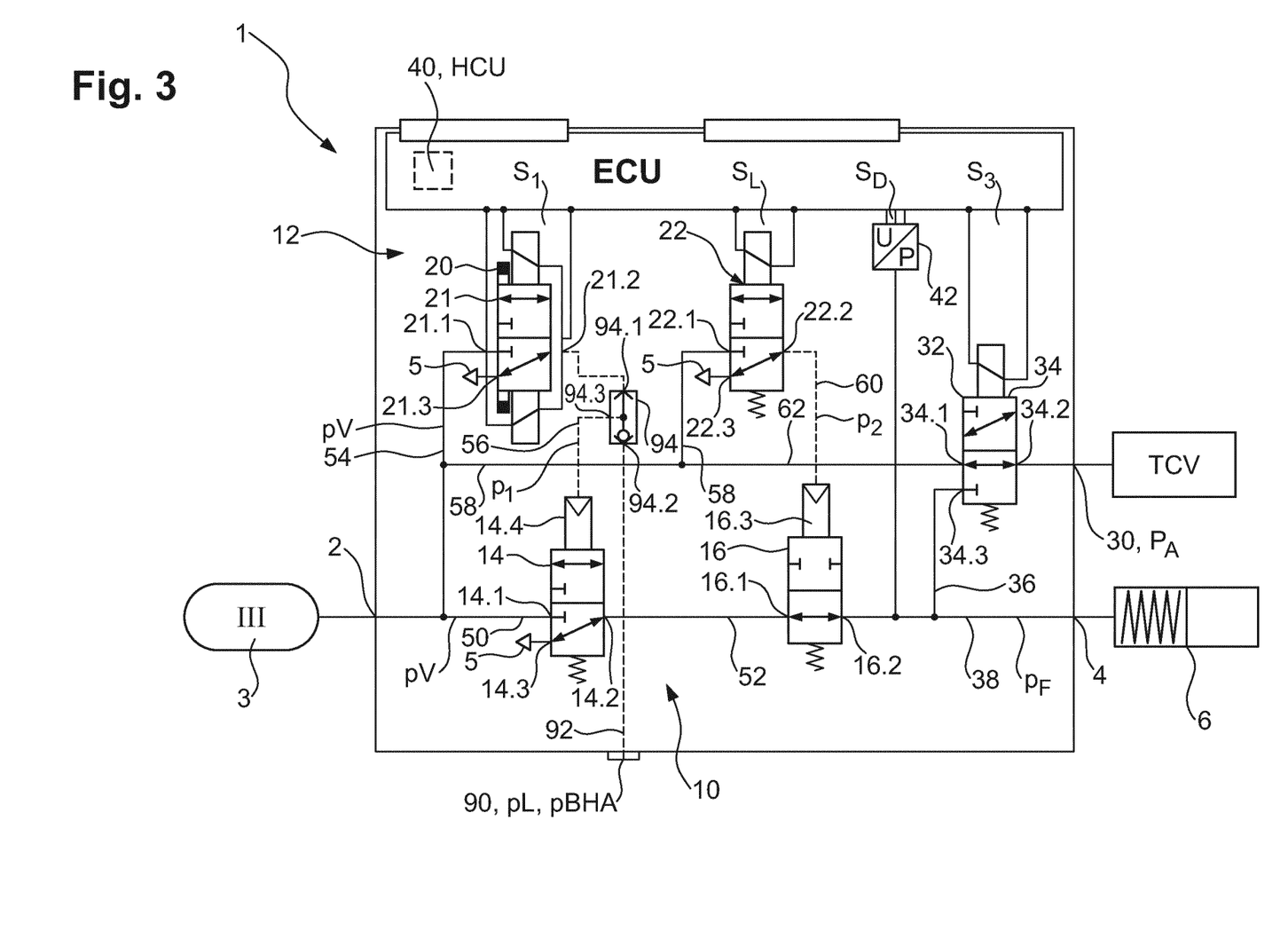
FIG. 3 shows a block diagram of an electropneumatic parking brake module according to a third exemplary embodiment.

A variant of the second exemplary embodiment (FIG. 2), namely Scandinavian trailer control, is shown in FIG. 3. As is apparent from FIG. 3, the only difference in the third exemplary embodiment of electropneumatic parking brake module 1 lies in the switching positions of trailer valve 32 being reversed. This means that trailer valve 32 according to the third exemplary embodiment (FIG. 3) is currentless in the switching position referred to as the first switching position in the first exemplary embodiment (FIG. 1) and thus connects first trailer valve connection 34.1 to second trailer valve connection 34.2 in a currentless state so that in a currentless state supply pressure pV is output as trailer control pressure pA and thus the service brakes of the trailer are released in the currentless state (parked state).

In the context of the disclosure, both European trailer control and Scandinavian trailer control can therefore be implemented in a particularly simple manner with electropneumatic parking brake module 1.

Figure 4:
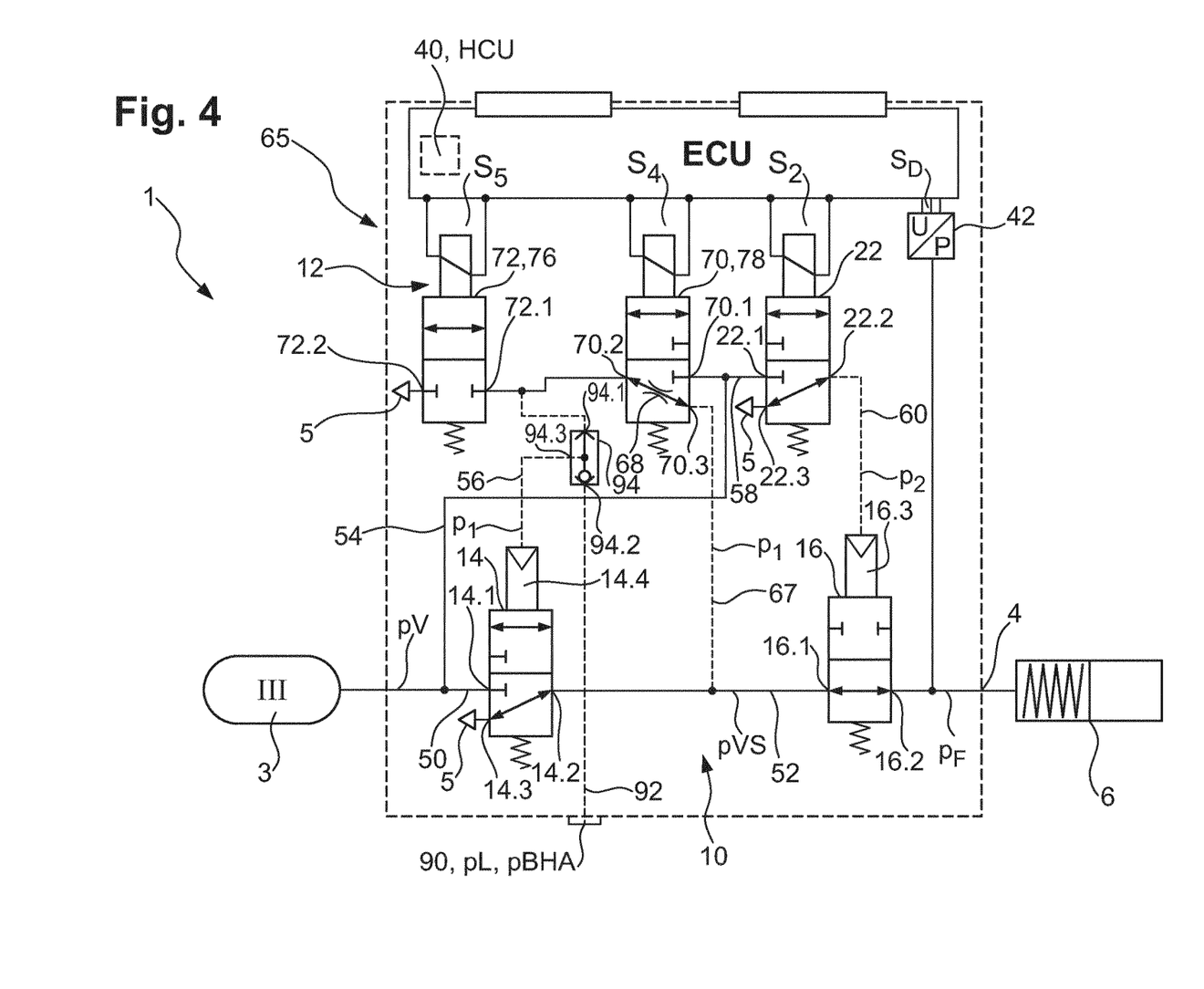
FIG. 4 shows a block diagram of an electropneumatic parking brake module according to a fourth exemplary embodiment.

The fourth exemplary embodiment according to FIG. 4 now shows an electropneumatic parking brake module 1, as is fundamentally known from the previous exemplary embodiments 2 and 3 (FIGS. 2 and 3). Bistable valve 21 is nevertheless replaced by a monostable inlet-outlet valve combination 65. Furthermore, the electropneumatic parking brake module 1 is not prepared for a trailer control valve TCV. This is preferable when the electropneumatic parking brake module 1 is to be used in commercial vehicles which do not tow a trailer, or do not have to supply an optional trailer with compressed air. Therefore, the trailer control valve connection 30, the trailer valve 32, the branch line 36, and the fourth pneumatic line 62 can be dispensed with without any replacement in such exemplary embodiments. While these elements are shown in all preceding embodiments, it is to be understood that they are only optional and not essential to the invention and may also be dispensed with in the first three exemplary embodiments. It is furthermore to be understood that the invention can also apply to variants in which the parking brake module 1 is not prepared for a trailer control valve TCV but is at least partially integrated in the latter. Corresponding connections and/or valves herein can also be dispensed with in this instance.

A particularly simple circuit layout is first described with reference to FIG. 4 in the fourth exemplary embodiment. Monostable inlet-outlet valve combination 65 has an inlet valve 70 and an outlet valve 72. Inlet valve 70 is in this exemplary embodiment formed as 3/2-way inlet valve 78 and has a first inlet valve connection 70.1, a second inlet valve connection 70.2, and a third inlet valve connection 70.3. Inlet valve 70 is formed as a monostable valve and is pretensioned into the first switching position shown in FIG. 4. By providing a fourth switching signal S4, inlet valve 70 can be switched from the first switching position shown in FIG. 4 into the second switching position, not shown in FIG. 4. In the second switching position, not shown in FIG. 4, first inlet valve connection 70.1 is connected to second inlet valve connection 70.2.

Second inlet valve connection 70.2 is connected to first pneumatic control line 56 which, as has already been described with reference to the exemplary embodiments 2 and 3, leads to first control connection 14.4 of first 3/2-way valve and into which alternating valve 94 is inserted. By switching inlet valve 70, first control pressure p1 can consequently be output. As has already been described with reference to FIGS. 2 and 3, the switch valve 94 is connected to the release control 92 by way of the second switch valve connection 94.2 such that the switch valve 94 outputs in each case the higher of the first control pressure p1 and the release control pressure pL to the third switch valve connection 94.3 and provides said higher pressure at the first control connection 14.4. As soon as this pressure provided at first control connection 14.4 exceeds the first threshold value, first 3/2-way valve 14 switches into the second switching position, not shown in FIG. 4, and working pressure pVS is output at working connection 14.2, which working pressure pVS can then be provided as spring brake pressure pF if 2/2-way check valve 16 is in the open switching position shown in FIG. 4. The spring brakes 6 are subsequently released.

In order to achieve a pneumatic self-retention of first 3/2-way valve 14, in the first three exemplary embodiments (FIGS. 1 to 3), bistable valve 21 was used which is stable both in the first and in the second switching position. Monostable inlet-outlet valve combination 65 is, however, not stable in the open switching position, but rather in the closed one. For this reason, electropneumatic parking brake module 1 according to the fourth exemplary embodiment (FIG. 4) has a return line 67 which returns working pressure pVS output by first 3/2-way valve 14 to first control input 14.4 and provides it there as first control pressure p1. In this manner, first control pressure p1 is maintained. A pneumatic self-retention is achieved. For this purpose, the return line 67 is connected to the third inlet valve connection 70.3.

In order for the pneumatic self-retention not to be directly cancelled and to enable switching of the switched states in the event of minor pressure variations at the spring-type actuator connection 4, according to this exemplary embodiment (FIG. 4) a throttle 68 is disposed in the return line 67, more specifically in the inlet valve 70.

Outlet valve 72 is provided to ventilate first control input 14.4 in order to allow first 3/2-way valve 14 to fall back into the first switching position shown in FIG. 4. Said outlet valve 72 is, according to the fourth exemplary embodiment (FIG. 4), formed as 2/2-way outlet valve 76. It has a first outlet valve connection 72.1 and a second outlet valve connection 72.2. First outlet valve connection 72.1 is connected to first pneumatic control line 56, and second outlet valve connection 72.2 is connected to a vent 5. 2/2-way outlet valve 76 is currentless in the closed first switching position shown in FIG. 4. 2/2-way outlet valve 76 can be moved into the second open switching position, not shown in FIG. 4, in which first outlet valve connection 72.1 is connected to second outlet valve connection 72.2, by a corresponding fifth switching signal S5. In this manner, first pneumatic control line 56 and thus first control connection 14.4 can be vented so that first 3/2-way valve 14 can fall back into the first switching position shown in FIG. 4. As a result of this, spring-type actuator connection 4 is vented even if check valve 16 is in the open switching position shown in FIG. 4.

In alternative embodiments not shown, the outlet valve 72 as well as the inlet valve 70 can be configured as 2/2-way valves. In such a case, the return line 67 would have to bypass the inlet valve 70 and be connected directly to the first pneumatic control line 56, for example by means of a T-fitting.

It is likewise possible for the outlet valve 72 to be configured as a 3/2-way valve, and for the inlet valve 70 to be configured as a 2/2-way valve. It would then be expedient for the return line 67 to be connected to the third connection of the outlet valve 72, in a manner analogous to the fourth exemplary embodiment, such that the outlet valve configured as a 3/2-way valve is connected to the vent 5, the first pneumatic control line 56, and the return line 67, wherein the return line 67 when currentless should be connected to the first pneumatic control line 56 in order for a reliable self-retention to be implemented.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Electropneumatic parking brake module
2 Supply connection
3 Compressed air supply
4 Spring-type actuator connection
5 Vent
6 Spring brake cylinder
10 Inlet-outlet valve unit
12 Electropneumatic pilot control unit
14 First 3/2-way valve
14.1 Inlet connection of the first 3/2-way valve
14.2 Working connection of the first 3/2-way valve
14.3 Venting connection of the first 3/2-way valve
14.4 First control input of the first 3/2-way valve
16 2/2-way check valve
16.1 First check valve connection
16.2 Second check valve connection
16.3 Second control input
20 Second 3/2-way valve
21 Bistable valve
21.1 First bistable valve connection
21.2 Second bistable valve connection
21.3 Third bistable valve connection
22 Third 3/2-way valve
22.1 Inlet connection of the third 3/2-way valve
22.2 Working connection of the third 3/2-way valve
22.3 Venting connection of the third 3/2-way valve
30 Trailer control valve connection
32 Trailer valve
34 Fourth 3/2-way valve
34.1 First trailer valve connection
34.2 Second trailer valve connection
34.3 Third trailer valve connection
36 Branch line
38 Spring brake pressure line
40 Electronic connection
50 First pneumatic line
52 Second pneumatic line
54 Third pneumatic line
56 First pneumatic control line
58 Third pneumatic line
60 Second pneumatic control line
62 Fourth pneumatic line 65 Monostable inlet-outlet valve combination
67 Return line
68 Throttle
70 Inlet valve
70.1 First inlet valve connection
70.2 Second inlet valve connection
70.3 Third inlet valve connection
72 Outlet valve
72.1 First outlet valve connection
72.2 Second outlet valve connection
76 2/2-way outlet valve
78 3/2-way inlet valve
90 Release control connection
92 Release control line
94 Switch valve
94.1 First switch valve connection
94.2 Second switch valve connection
94.3 Third switch valve connection
ECU Electronic control unit
pA Trailer control pressure
pV Supply pressure
pF Spring brake pressure
pBHA Service brake pressure rear axle
p1 First control pressure
p2 Second control pressure
pL Release control pressure
S1 First switching signal
S2 Second switching signal
S3 Third switching signal
SD Pressure signal
TCV Trailer control valve

The invention claimed is:

1. An electropneumatic parking brake module, comprising:
a supply connection configured to connect a compressed air supply,
at least one spring-type actuator connection configured to connect at least one spring brake cylinder,
an inlet-outlet valve unit configured to assume at least a first switching position and a second switching position,
an electropneumatic pilot control unit configured to output at least a first control pressure at the inlet-outlet valve unit, and
a release control connection at which a release control pressure is configured to be output by an external unit to initiate the inlet-outlet valve unit to switch to the first switching position,
wherein, in the first switching position of the inlet-outlet valve unit, the spring-type actuator connection is connected to the supply connection for outputting a spring brake pressure, and, in the second switching position of the inlet-outlet valve unit, the spring-type actuator connection is connected to a venting connection of the inlet-outlet valve unit, and
wherein the inlet-outlet valve unit is in the second switching position when the first control pressure is below a first threshold value.

2. The electropneumatic parking brake module as claimed in claim 1, wherein the release control pressure is configured to be selectively output for exerting an anti-compound function and/or an emergency release function.

3. The electropneumatic parking brake module as claimed in claim 1, wherein the release control pressure is a service brake pressure of a rear axle.

4. The electropneumatic parking brake module as claimed in claim 1, wherein the pilot control unit has a ventilation connection which, for venting the first control pressure, is connected to the release control line which leads to the release control connection.

5. The electromagnetic parking brake module as claimed in claim 1, having a switch valve which is disposed between the pilot control unit and the inlet-outlet valve unit, wherein the switch valve has a first switch valve connection configured to receive the first control pressure from the pilot control unit, a second switch valve connection that is connected to the release pressure connection, and a third switch valve connection that is connected to the inlet-outlet valve unit and selectively relays the first control pressure or the release control pressure to the inlet-outlet valve unit.

6. The electropneumatic parking brake module as claimed in claim 5, wherein the switch valve is disposed between a bistable valve and a first 3/2-way valve, and wherein the first switch valve connection is connected to a second bistable valve connection, and the third switch valve connection is connected to a first control pressure.

7. The electropneumatic parking brake module as claimed in claim 1, wherein the inlet-outlet valve unit has at least one first pneumatically controlled 3/2-way valve having exactly two switching positions.

8. The electropneumatic parking brake module as claimed in claim 7, wherein the inlet-outlet valve unit has at least one 2/2-way check valve, and wherein the first 3/2-way valve serves as an inlet-outlet valve for the spring-type actuator connection for aerating and venting the spring-type actuator connection and the 2/2-way check valve serves to block an aeration and ventilation of the spring-type actuator connection.

9. The electropneumatic parking brake module as claimed in one claim 7, wherein the first 3/2-way valve has an inlet connection, a working connection and a venting connection, and the first 3/2-way valve is formed to reciprocally connect the working connection to the inlet connection and the venting connection.

10. The electropneumatic parking brake module as claimed in claim 9, wherein the 2/2-way check valve has a first check valve connection and a second check valve connection, wherein the first check valve connection is connected to the working connection, and the second check valve connection is connected to the spring-type actuator connection.

11. The electropneumatic parking brake module as claimed in claim 1, wherein, in the first switching position of the inlet-outlet valve unit, the spring brake pressure can be fed through directly from the supply connection to the spring-type actuator connection.

12. The electropneumatic parking brake module as claimed in claim 1, wherein the inlet-outlet valve unit has at least one 2/2-way check valve.

13. The electropneumatic parking brake module as claimed in claim 1, wherein the electropneumatic pilot control unit has at least a second 3/2-way valve, wherein the second 3/2-way valve is provided to output the first control pressure.

14. The electropneumatic parking brake module as claimed in claim 13, wherein the second 3/2-way valve is a bistable valve.

15. The electropneumatic parking brake module as claimed in claim 14, wherein the bistable valve has a first bistable valve connection, a second bistable valve connection and a third bistable valve connection, wherein the first bistable valve connection is connected to the supply connection, the second bistable valve connection is configured to output the first control pressure and the first control pressure is configured to be vented via the third bistable valve connection.

16. The electropneumatic parking brake module as claimed in claim 7, wherein a second bistable valve connection is connected to or configured to be connected to a first control input of the at least one first pneumatically controlled 3/2-way valve by a first pneumatic control line.

17. The electropneumatic parking brake module as claimed in claim 16, wherein the release control pressure is configured to be output directly into the first pneumatic control line.

18. The electropneumatic parking brake module as claimed in claim 1, wherein the electropneumatic pilot control unit has a monostable inlet-outlet valve combination with an inlet valve and an outlet valve for outputting the first control pressure.

19. The electropneumatic parking brake module as claimed in claim 18, further comprising a return line which provides the pressure output by a first 3/2-way valve as the first control pressure at the inlet-outlet valve unit.

20. The electropneumatic parking brake module as claimed in claim 19, wherein the pressure output by the first 3/2-way valve is provided in a throttled manner as the first control pressure via the return line at the inlet-outlet valve unit.

21. The electropneumatic parking brake module as claimed in claim 19, wherein the return line is connected directly to the inlet-outlet valve unit.

22. The electropneumatic parking brake module as claimed in claim 19, wherein the inlet valve has a third inlet valve connection connected to the return line, wherein, in a first switching position of the inlet valve, a second inlet valve connection is connected to a first inlet valve connection, and, in a second switching position of the inlet valve, the second inlet valve connection is connected to the third inlet valve connection.

23. The electropneumatic parking brake module as claimed in claim 22, having a switch valve which is disposed between the pilot control unit and the inlet-outlet valve unit,
wherein the switch valve has a first switch valve connection configured to receive the first control pressure from the pilot control unit, a second switch valve connection that is connected to the release pressure connection, and a third switch valve connection that is connected to the inlet-outlet valve unit and selectively relays the first control pressure or the release control pressure to the inlet-outlet valve unit, and
wherein the switch valve is disposed between the inlet valve and the first 3/2-way valve, and wherein the first switch valve connection is preferably connected to the second inlet valve connection, and the third switch valve connection is preferably connected to a first control pressure.

24. The electropneumatic parking brake module as claimed in claim 18, wherein the inlet valve has a first inlet valve connection connected to the supply connection and a second inlet valve connection connected to the inlet-outlet valve unit, wherein the first control pressure can be output at the second inlet valve connection by switching the inlet valve.

25. The electropneumatic parking brake module as claimed in claim 18, wherein the outlet valve has a first outlet valve connection connected to the inlet-outlet valve unit and a second outlet valve connection connected to a vent for venting the first control pressure.

26. The electropneumatic parking brake module as claimed in claim 1, wherein the electropneumatic pilot control unit has at least a third 3/2-way valve for outputting a second control pressure.

27. The electropneumatic parking brake module as claimed in claim 26, wherein the third 3/2-way valve has an inlet connection, a working connection and a venting connection, and the third 3/2-way valve is formed to reciprocally connect the working connection to the inlet connection and the venting connection.

28. The electropneumatic parking brake module as claimed in claim 27, wherein the inlet-outlet valve unit has at least one 2/2-way check valve, and
wherein the inlet connection is connected to the supply connection, the working connection is connected to a second control input of the 2/2-way check valve and the venting connection is connected to a vent.

29. The electropneumatic parking brake module as claimed in claim 1, having a trailer control valve connection for providing a trailer control pressure.

30. The electropneumatic parking brake module as claimed in claim 29, wherein the trailer control valve connection is connected to a trailer valve which is provided, in a first switching position, to output at least the spring brake pressure as trailer control pressure at the trailer control valve connection.

31. The electropneumatic parking brake module as claimed in claim 30, wherein the trailer valve has a second switching position for performing a trailer control position function.

32. The electropneumatic parking brake module as claimed in claim 31, wherein the trailer valve is formed as a fourth 3/2-way valve and has a first trailer valve connection, a second trailer valve connection and a third trailer valve connection, wherein the first trailer valve connection is connected to the supply connection, the second trailer valve connection is connected to the trailer control valve connection and the third trailer valve connection is connected to a branch line which branches off from a spring brake pressure line connected to the spring-type actuator connection.

33. The electropneumatic parking brake module as claimed in any claim 1, further comprising an electric control unit with an electric connection to receive parking brake signals and to provide corresponding switching signals at least to the pilot control unit.

34. The electropneumatic parking brake module as claimed in claim 1, having a pressure sensor configured to detect the spring brake pressure and provide a corresponding pressure signal.

* * * * *